United States Patent [19]

Smith

[11] Patent Number: 5,895,501
[45] Date of Patent: Apr. 20, 1999

[54] VIRTUAL MEMORY SYSTEM FOR VECTOR BASED COMPUTER SYSTEMS

[75] Inventor: James E. Smith, Mt. Horeb, Wis.

[73] Assignee: Cray Research, Inc., Eagan, Minn.

[21] Appl. No.: 08/706,806

[22] Filed: Sep. 3, 1996

[51] Int. Cl.[6] .................................. G06F 12/10; G06F 15/76
[52] U.S. Cl. ........................ 711/207; 711/128; 711/208; 395/800.02; 395/563
[58] Field of Search ........................ 711/207, 208, 711/128; 395/563, 800.02, 800.03, 800.04, 800.05, 800.06

[56] References Cited

U.S. PATENT DOCUMENTS

| | | | |
|---|---|---|---|
| 4,128,880 | 12/1978 | Cray | 395/800.04 |
| 4,661,900 | 4/1987 | Chen et al. | 395/800.04 |
| 4,768,146 | 8/1988 | Nagashima et al. | 711/207 |
| 4,991,083 | 2/1991 | Aoyama et al. | 711/207 |
| 5,063,497 | 11/1991 | Cutler et al. | 395/800.06 |
| 5,430,856 | 7/1995 | Kinoshita | 711/209 |

*Primary Examiner*—Reginald G. Bragdon
*Attorney, Agent, or Firm*—Schwegman, Lundberg, Woessner & Kluth, P.A.

[57] ABSTRACT

A virtual memory management system for a vector based processing system detects early page or segment faults allowing pipelined instructions to be halted and resumed once the pages or segments required for a job are available in main storage. A multiplier is used for stride accesses, and min and max registers are used for gather/scatter instructions to provide a range of addresses to be accessed during a job. These ranges are determined early enough in execution of instructions related to a job to allow saving the state of the processor and resuming execution of the instructions once the data is available in main storage.

38 Claims, 4 Drawing Sheets

VIRTUAL MEMORY SYSTEM FOR VECTOR BASED COMPUTER SYSTEMS

FIELD OF THE INVENTION

The present invention relates to methods and systems for managing virtual memory in a vector based computer system and in particular to early detection of page faults in vector operations.

BACKGROUND OF THE INVENTION

Many scientific data processing tasks involve extensive arithmetic manipulation of ordered arrays of data. Commonly, this type of manipulation or "vector" processing involves performing the same operation repetitively on each successive element of a set of data. Most computers are organized with an arithmetic unit which can communicate with a memory and with input-output (I/O). To perform an arithmetic function, each operand (numbers to be added, subtracted or multiplied or otherwise operated upon) must be successively brought to the arithmetic unit from memory, the functions must be performed, and the result must be returned to the memory. Machines utilizing this type of organization, called scalar machines, have been found inefficient for practical use in large scale vector processing tasks.

In order to increase processing speed and hardware efficiency when dealing with ordered arrays of data, vector machines have been developed. A vector machine is one which deals with ordered arrays of data by virtue of its hardware organization, rather than by a software program and indexing, thus attaining higher speed of operation. One such vector machine is disclosed in U.S. Pat. No. 4,128,880, issued Dec. 5, 1978 and incorporated herein by reference. The vector processing machine of this patent employs one or more registers for receiving vector data sets from a central memory and supplying the data to segmented functional units, wherein arithmetic operations are performed. More particularly, eight vector registers, each adapted for holding up to sixty-four vector elements, are provided. Each of these registers may be selectively connected to any one of a plurality of functional units and one or more operands may be supplied thereto on each clock period. Similarly, each of the vector registers may be selectively connected for receiving results. In a typical operation, two vector registers are employed to provide operands to a functional unit and a third vector register is employed to receive the results from the functional unit.

Further vector type machines are described in U.S. Pat. No. 4,661,900, issued Apr. 28, 1987 and incorporated herein by reference wherein multiple processors are each connected to a central memory through a plurality of memory reference ports. The processors are further each connected to a plurality of shared registers which may be directly addressed by the processors at the faster access rates commensurate with intraprocessor operation. A vector register design provides each register with at least two independently addressable memories, to deliver data to or accept data from a functional unit.

A better memory architecture is desired for vector computers to perform well. Many modern operating systems and application programs assume and rely on virtual memory functions. In a virtual memory organization, programs running as jobs in a computer identify data by means of a virtual address. These addresses must be mapped or translated by the computer into real addresses to find the data identified by the virtual address. The real address corresponds to real storage, such as fast physical random access memory used by the computer. This mapping must be done quickly so the processors do not have to wait long for the data. Some computers use a small associative mapping in which a table of pairs of real and virtual addresses is accessed in one step. This is fairly expensive to implement in hardware, so it is usually combined with a complete table of virtual and real addresses residing in main memory and managed by the operating system. Such tables take longer to search and find the corresponding address given one of the virtual or real addresses.

In virtual memory organizations, data is organized into blocks, referred to as segments. Some systems use segments of varying lengths, while others may use segments of one or more fixed lengths. Since the real storage is usually much smaller than the virtual address range, blocks of data are transferred back and forth between real storage and a secondary storage such as disk drives, tape drives, optical storage and other slower, cheaper forms of long term storage. The blocks of data are transferred back and forth between real and secondary storage in accordance with whether the computer will likely need the data in the near future, or whether other data will be needed sooner that is not yet in real storage. The virtual address structure in such memory organizations comprises a segment portion and an offset within the segment portion directly pointing to the address of the data. Some systems use segments of varying lengths, making management of the memory system more complex.

A major criterion used for evaluating a memory addressing organization or architecture is performance. In many cases, the value of an architecture feature can be judged in terms of clock periods gained or lost when executing a sequence of instructions. However, features of the memory system organization often affect performance in ways that only can be measured on a larger scale. Large blocks of virtual memory address ranges compete for the same real memory resources. Contending requirements must be arbitrated and managed efficiently by the operating system, and such management profoundly affects system performance.

Virtual memory organization provided by operating systems are well known in the art for their ability to optimize the use of memory in a hierarchical memory system. Virtual memory managers can produce system memory access speeds that approach the access speed of the fastest memory components in the system. They do this by keeping active blocks such as pages in real memory which has the fastest access speed, and as the blocks of data become inactive, migrating them back to lower speed memory. When a job tries to access data and the corresponding virtual address does not have a real address assigned to it, a page fault is generated. On page faults, the virtual memory manager transfers data contained in that page to real memory. This can take a significant number of clock periods to occur.

Vector processing supercomputers have special memory needs that are not met by standard virtual memory system. Vector machines employ pipelining techniques to hide memory latency through the prefetching of instructions and data.

The use of pipelining in vector machines places an additional burden on an operating system. System exceptions can incur substantial time penalties as the operating system software attempts to determine the state of the system at the time of the exception. Additional hardware may be required to track the state of the machine through all stages of pipelining. The difficulty of determining (and saving) the state of a pipelined vector machine has led designers of past systems to minimize hardware impact by designing many exceptions as non-recoverable. A non-recoverable exception results in aborting a job because correct execution cannot be resumed.

Demand-paged virtual memory systems are difficult to implement in a vector supercomputer. In conventional virtual memory systems, the virtual to real memory mapping tables reside in main or real memory. For reasonable performance, a recently-used subset of memory mapping information is cached via a translation lookaside buffer (TLB). This requires extra hardware to control the loading to the buffers from memory-resident page tables, or special traps and privileged instructions have to be provided to support a software-managed lookaside buffer effectively. A second drawback in virtual memory systems lies in the fact that, even with lookaside buffers, memory mapping hardware may require additional pipeline stages. It is necessary to translate virtual addresses to real address, and to check for translation faults caused by unmapped addresses. Finally, addressing exceptions (traps) occur at times that are difficult for the hardware to handle. Potentially any memory reference can result in a trap. This causes problems in a highly pipelined processor where a trap condition is not detected until several clock periods after an instruction issues. Particularly difficult cases occur with vectors where a trap can occur in the middle of a vector load or store (or multiple traps within the same load or store). While not impossible, handling addressing exceptions adds to hardware complexity, and can easily lead to reduced performance.

It is evident that there is a need for a memory management system for a vector based computer system that provides some of the mapping capabilities of virtual memory management, but is tailored for a vector processing environment. There is a need for such a system to anticipate potential page faults near the beginning of execution of an operation on a vector. Such a system should be designed such that addressing errors are detected as soon as possible after instruction execution begins.

SUMMARY OF THE INVENTION

A virtual memory system for a vector based computer system provides early detection of page or segment faults by determining the range of addresses that a vector load or store will access. For stride accesses, a multiplier finds the product of the stride and the vector length. For gather/scatter instructions, max and min registers containing pre-computed values indicate the range of addresses. By determining address ranges immediately, a page or segment fault is signaled a fixed and small number of clock periods after instruction issue. This provides for simplification of precise traps and quick recovery from such faults. Where segments are used, the use of upper and lower bounds in a segment descriptor enable access to large memory-mapped files.

In one embodiment of the invention, a page based memory architecture supports multiple page sizes within a system. A translation lookaside buffer (TLB) is used to translate page addresses. The page size is fixed for a given job or process and set in a register for memory operations involving the job. Large jobs use large pages so that more memory can be mapped by the TLB resulting in fewer misses. Smaller jobs use smaller pages so that excess memory in a page is not wasted by not being used. In a further embodiment, each job utilizes a separate page size for instructions and data. The page sizes are both noted in registers.

In a further embodiment, each job has several page sizes allowed. A fully associative TLB contains page size as part of each entry. The page size is used by a look-up mechanism to determine which bits in the logical address should be used to find the real address of the page.

Yet further embodiments are segment based memory architectures. Segments are inherently of variable size, and the addresses are translated by using a segment number to read a translation descriptor directly from a segment table or TLB. In one version, upper and lower bounds in a segment descriptor enable access to large memory-mapped files. Part of the logical address points to a set of entries in the TLB, and a comparison between address bits and a tag belonging to each entry determine which if any, of the selected set of entries should be used for address translation. The use of set associative TLBs for segments provides the ability to avoid storing an entire large segment, thus avoiding filling local memory with data that is not needed.

Recoverable traps are provided when an addressing fault occurs for each of the embodiments. The traps are detected at the page or segment TLB which occurs a small fixed number of clock periods after issuance of the instruction. The state for only a few instructions needs to be captured, backed up or otherwise accounted for, greatly reducing the complexity of recovering from a page fault.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures. Signals and connections may be referred to by the same number or label, and the actual meaning should be clear from the context of use.

Figure 1:
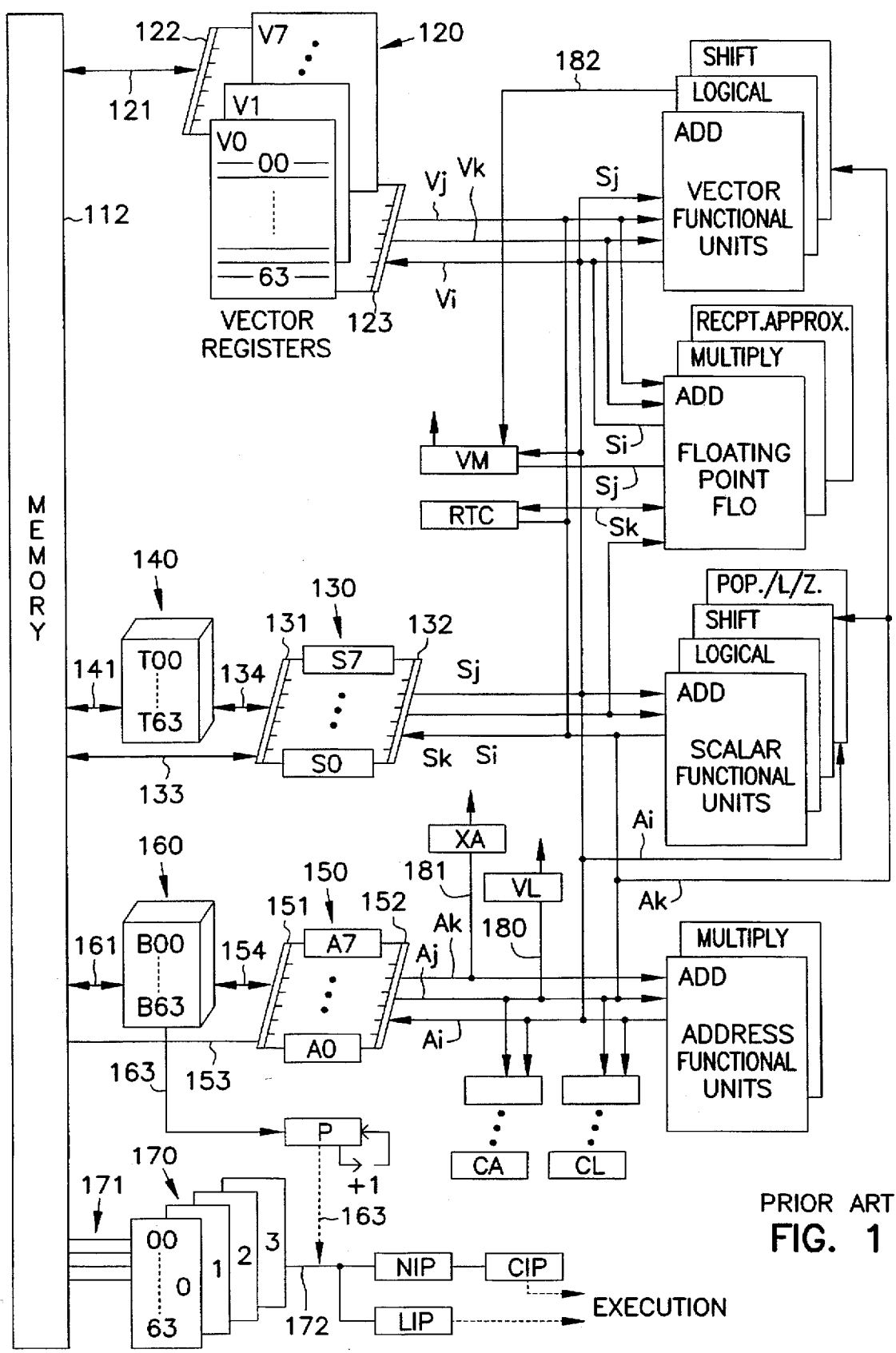
FIG. 1 is a detailed block diagram of a prior art vector based computer system.

In FIG. 1, a prior computer system as described in U.S. Pat. No. 4,128,880, is shown to provide the setting for the present invention. A memory 112 provides arrays of data, referred to individually as operands for a plurality of vector registers 120. The vector registers form the major computational registers of the computer, since they provide for the high speed vector processing of data. In one embodiment, there are 64 individual vector registers. Each register has 64 individual elements, as indicated by the designation of elements 00 through 63 on vector register V0. Each element can hold a 64 bit word.

The specific numbers used herein for word length, number of registers, length of vector registers and the like relate to one embodiment. It will be understood that the principles according to the present invention as set forth herein are equally applicable to other configurations of machines using a different number of vector register, vector lengths, or a different word size.

A data path or trunk 121 is provided for data transfers between the vector registers and memory 112. Data path 121 connects to a signal path select, or fan-out 122 for communicating with individual vector registers. Another fan-out 123 is indicated for communicating from any of the vector registers to the functional units.

In the computer system of FIG. 1, there are three functional units dedicated to vector processing. These are the add unit, the logical unit and the shift unit. Three additional functional units are shared between the vector and scalar portions of the machine. These are the floating point functional units for addition, multiplication and reciprocal approximation. In further embodiments, and detail not shown, there are parallel units performing the same functions, and the same operations on different portions of the registers in parallel. Pipeline processing is also provided, where the functional units are coupled to pipeline type registers holding instructions and/or data for execution in succeeding machine cycles.

Scalar registers are also provided as indicated at 130 for operation with four scalar units as indicated. A plurality of T registers 140 are provided to support scalar operations. The T registers 140 communicate with memory by a data path 141. Fan-outs 131 and 132 are provided for communicating with individual S registers. A data trunk 133 leads directly between fan-out 131 and memory 112. Another data path 134 communicates between the T registers and the fan-outs for the scalar registers.

A plurality of address registers 150 are provided. Fan-outs 151 and 152 are used for communication with individual address registers. A plurality of B registers 160 are provided to support address operations. A data path 154 provides communication from the B registers to fan-out 151 for the A registers, and a data path 153 interconnects memory 112 and the A registers.

Instruction buffers 170 are provided as part of the instruction issue and control portions of the computer. In one embodiment, four instruction buffers are utilized. Each instruction buffer has capacity for 64 instruction parcels, numbered 00 through 63 as indicated with respect to instruction buffer 0. Instructions from the instruction buffers are fed via an instruction line 172 to a pair of control registers NIP, which stands for next instruction parcel and LIP which stands for lower instruction parcel. Instructions from NIP may be passed to the current instruction parcel register CIP.

The P register is part of the instruction issue and control portions of the computer. It connects via lines 162 and 163 to the B registers and to the instruction path 172.

A vector length register VL is provided, which may receive an input on a data line 180 from the A registers. XA refers to an exchange control register which is connected by a data line 181 to the A registers. VM is the vector mask register, and RTC is the real time clock.

The data and instruction paths or trunks among the various registers and functional units are indicated by means of letters V for vector, S or scalar and A for address. In addition, subscripts i, j and k are used. Subscripts j and k are used for registers or data paths supplying operands, and subscript i is used for registers or data paths receiving results.

Data paths $V_j$ and $V_k$ run from vector register fan-out 123 to the vector functional units and the floating point functional units. Data path $V_i$ runs from the vector functional units and the floating point functional units to vector register fan-out 123.

In similar manner data paths $S_j$ and $S_k$ run from scalar register fan-out 132 to the scalar functional units and the floating point functional units. Data path $S_i$ returns from the floating point functional units and the scalar functional units to fan-out 132. Additionally, data path $S_j$ connects to the real time clock, the vector mask register, and to the vector functional units. A data path 182 connects from the logical unit of the vector functional units to the vector mask register.

Data paths $A_j$ and $A_k$ run from fan-out 152 of the address register to the address functional units. In addition, the $A_k$ path provides address operands to the shift scalar functional units. In addition, the $A_k$ path provides address operands to the shift scalar functional unit and the shift vector functional unit. Data path $A_k$ also runs to the channel address and channel limit registers. $A_i$ data path runs from the address functional units, the CA and CL registers, and from the population/leading zero scalar functional unit to fan-out 152 of the address registers.

Vector Registers

As previously mentioned, the V registers are the major computational registers of the computer system. When associated data, such as that in an array, is grouped into successive elements of a V register, the register quantity is considered a vector. Examples of vector quantities are rows or columns of a matrix, table or spreadsheet. Computational efficiency is achieved by processing each element of a vector identically, whether by a single functional unit, or multiple units each processing a portion of the vector. Vector instructions provide for the iterative processing of successive V register elements. For a given vector operation, one or more V registers are designated for providing operands ($V_j$ and $V_k$ registers), and another V register is designated to receive the results ($V_i$ register). A vector operation begins by obtaining operands from the first element of one or more V registers and delivering the results to the first element of the $V_i$ register. Successive elements are provided in each clock period, and as each operation is performed, the result is delivered to successive elements of the result V register, $V_i$. The vector operation continues until the number of operations performed by the instruction equals a count specified by the contents of the vector length (VL) register. Vectors having lengths exceeding 64 are handled under program control in groups of 64 and a remainder.

The contents of a V register are transferred to or from memory over data path 121 in a block mode by specifying a first word address in memory, an increment for the memory address, and a vector length. The transfer then proceeds beginning with the first element of the V register at a maximum rate of one word per clock period, depending upon memory bank conflicts. In a further embodiment, a software memory manager is used to determine the address for each successive word, as they may or may not be contiguously stored.

The vector length register (VL) can be set by transmitting a value to and from an A register. The VL register specifies the length of all vector operations performed by vector instructions, and the corresponding length of the vectors held by the V registers.

Page Based Memory Architectures

Several virtual memory architectures are disclosed, each providing for calculation of a range of addresses that a vector load or store will access, allowing early detection of page or segment faults. For stride accesses, a multiplier finds the product of the stride and the vector length. For gather/scatter instructions, max and min registers containing precomputed values indicate the range of addresses. By determining address ranges immediately, a page or segment fault is signaled a fixed and small number of clock periods after instruction issue.

Figure 2:
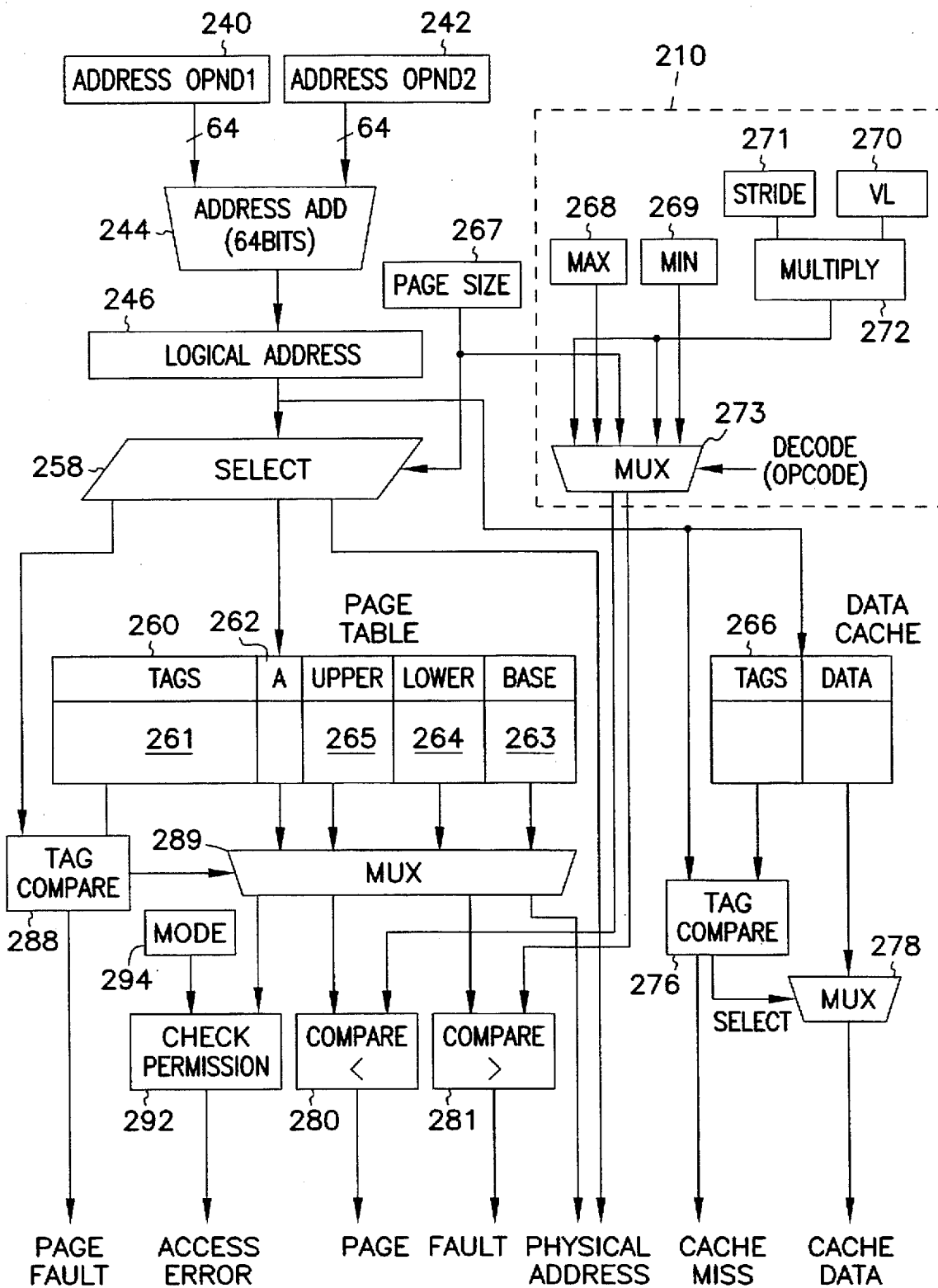
FIG. 2 is a block diagram representation of a page based address translation and data cache memory access mechanism for a vector based computer system.

The first architecture is shown in FIG. 2. It provides for multiple page sizes within a system, where the page size for a given job is fixed and set in a register for memory operations involving the job. Large jobs may use large pages, and small jobs may use small pages. In further embodiments, two different page sizes are provided, one for instructions and one for data. In yet a further embodiment, two different data page sizes are provided, each size being identified in a separate register. The ability to provide for different page sizes provides for much more efficient memory utilization. A large page size for small jobs means that there is much unused memory per page that could otherwise be available for other jobs. Therefore, small page sizes are used for small jobs. Large pages sizes are used for large jobs. This also helps when translating addresses. More pages can be referenced given a set amount of memory with which to map addresses.

A second architecture is also described with reference to FIG. 2. In the second architecture, there are multiple page sizes allowed for each job. A TLB contains page size as part of each table entry. The page size is then used by a look-up mechanism to determine which bits in the logical address should be used to find the real address of the page.

The third and fourth architectures are segment based. Segments are inherently of variable size and are translated by using a segment number to read a translation descriptor directly from a segment TLB. In the third architecture shown in FIG. 3, upper and lower bounds in a segment descriptor enable access to large memory-mapped files. In the fourth architecture shown in FIG. 4, an associative TLB is used. Part of the logical address points to a set of entries in the table, and a comparison between address bits and a tag belonging to each entry determines which, if any, of the selected set of entries should be used for address translation.

Recoverable traps are provided when an addressing fault occurs for each of the architectures. In one embodiment, traps are detected at the page or segment TLB. A TLB miss normally occurs a small, fixed number of clock periods after issuance of the instruction. The state of selected registers for only a few instructions is captured, backed up, or otherwise accounted for. For scalar loads and stores, the fault is detected at the translation table and subsequent loads and stores are blocked immediately. For stride one vector loads and stores, the vector length is added to a vector base address to arrive at the upper limit of the addresses to be issued. Then the base address and the upper limit are both compared with upper and lower bounds information held in the translation table. A fault is then handled in a way similar to the scalar case.

In non-unit stride vector loads and stores, an extension of the unit stride fault detecting mechanism is used. The vector length and the stride are multiplied to arrive at the upper limit. For vector gather/scatters a range of index values is first determined. This is done using min and max registers which hold the minimum and maximum index values from an index set. All of the fault detection using the above trap mechanisms are provided at the TLB level and occur very early in the execution of operations allowing them to be stopped very quickly.

FIG. 2 shows the memory interface section of the processor of FIG. 1 in greater detail and illustrates the first and second memory architectures involving memory management by pages. Following the issuance of an instruction, a first address operand 240 and a second address operand 242 are added together, using adder 244 to form a logical address 246. The logical address 246 is shown for example as 64 bits. It will be recognized by those skilled in the art that other lengths may be used without departing from the spirit of the invention. The logical address 246 is comprised of a page identifying portion, and an offset into the page to identify where the data starts. A portion of the logical address, the page size, is fed through a selector 258 which provides the proper bits from the logical address to a page table 260. In one embodiment, the page table is a TLB which contains references to only pages which are resident in local fast storage. The page table 260 comprises a tag field 261 for associative lookup, access control bits 262 for controlling protection, cacheability and coherence, and several page translation descriptor fields including a base 263, lower 264 and upper 265. The protection bits contain read/write/ execute attributes, the cacheability bit indicates whether the page contains data that may be placed in a data cache 266, and the coherence bit indicates whether the page contains data upon which data coherence must be maintained, either by hardware or software. Base field 263 comprises the page frame bits that indicate where in physical memory the page begins. Upper field 265 contains a value representing the number of logical pages at higher addresses that are physically contiguous with the referenced page, and lower field 264 provides the number of logical pages at lower addresses that are physically contiguous with the referenced page. The values in upper + lower +1 is equal to the extent of contiguous memory that can be treated as a segment for vector references.

Several state registers are required to support address translation. A page size register 267 contains the size of data pages for the executing job. In one embodiment, a minimum page granularity of 2K words is provided, and the register contains a power of 2 multiple. As processor sizes and speeds are improving, the maximum page size is greater than 2 million words in size which can be represented with an eight bit register. Larger page sizes and registers are contemplated in further embodiments. In another embodiment, a page size register for instructions is included either as a portion of the page size register 263 or as a separate register. Because many programs have data sizes much larger than the machine code, using a smaller page size for instructions reduces the amount of wasted memory.

A vector address range calculator referred to as a range finder comprising elements enclosed by a broken line 210 provides an indication of the addresses of operands required to be resident in main memory for a given vector. A max register 268 contains the maximum offset from the base value that is referenced by a gather or scatter operation. The offset in one embodiment is shortened by discarding lower bits and keeping only the page number bits. A min register 269 contains the minimum offset from the base value that is referenced by a gather or scatter. This offset register may also be shortened by discarding lower bits and keeping only the page number bits. As such, both the min and max registers are at least as long as the page number bits. In one embodiment, a vector min/max instruction scans a vector register and simultaneously determines both the min and max values. The results are placed directly in the min and max registers. The instruction is also useful for user code that looks for minima and maxima. It is also usable to modify compressed iota-type instructions to generate the min and max index values as a by product. Scalar instructions to move min and max values to and from scalar registers are used in a further embodiment.

A vector length register 270 and stride register 271 also located within range finder 210 provide their values to a multiplier 272 to provide an upper limit of addresses to a multiplexor 273. If the stride happens to be negative, then a lower bound is provided to multiplexor 273. The values in the min register 269 and max register 268 are also provided to multiplexor 273 which selectively provides output to a pair of compare modules 280 and 281 for determining page faults.

The page table 260 is scanned for the page. If the page is not found in the table, a tag compare module 288 generates a page fault indication. If the page is found in the table, the real page address is provided via a multiplexor 289 which is coupled to the page table along with the offset from the virtual address to form the physical address. Multiplexor 289 also provides the access bits to a permissions module 292 which after receiving a memory access privilege level from a mode module 294 either grants permission to access the page, or provides an access error signal.

An example of address translation is now provided. Registers containing address operands are read and the operands are added to form an effective logical (virtual) address. In the case of scalar accesses, the logical addresses are used immediately to access the data cache 266. If there is a cache hit as indicated by tag compare 276, the page translation hardware is not on the critical data path and data is provided via a multiplexor 278 coupled to the data cache 266. However, page translation should proceed in case of a cache miss and to check access permissions via permission module 292.

The page size register 267 is used to select the address bits that are to be used to index into the translation table. Selector 258 is a variable length shifter that uniformly aligns the index and tag fields of the address. If there are separate data and instruction page sizes, then the type of reference determines which of the two size values is used to control the select shifter. Then, the index field of the address is used to select the set of descriptors to be examined in the set associative page translation table (TLB) embodiment. The tag field of the address is compared with the tag fields in the descriptors of the addressed set. If one of the tags matches, the descriptor information for the matching table entry is selected. If none of the tags match, there is a page fault to the operating system.

The following operations are performed simultaneously:

1) The access permission bits from the descriptor are compared with the type of memory reference being made and the mode. If the type of access being attempted is not allowed, there is a recoverable trap to the operating system.

2) In the event of a vector memory reference, the upper and lower fields are compared with the max and min register values or the vector length times the stride value to determine if all the elements to be referenced are within the region of contiguous pages surrounding the base page. If all the referenced elements are not within range, there is a recoverable trap to the operating system.

3) The base field is concatenated with the page offset bits of the logical address. This is the physical address.

In the next step, providing there are no faults, vector operations send the physical (real) address, and the upper and lower values to the address port of the main memory. There, standard gather and scatter instructions check the actual index values against the upper and lower values. If an error is detected at the port, the max/min limits must have been erroneously set, and the job is trapped in an unrecoverable manner. If there is a data cache miss, scalar operations use the physical address to load the cache line. In the event of non-cacheable scalar references, the physical address is used directly to load or store data.

In the event of a fault, the operating system takes over. For page faults, there are two possibilities. If the requested page is in physical memory, but its table entry was missing, the table entry is updated and the user processing is free to resume. If the requested page is not resident in memory, the operating system has to have the requested page moved into main memory. Depending on the algorithms used by the operating system, this may involve moving pages to form a block of contiguous pages which form a software-defined segment. The upper and lower fields are added so that vector references are informed of contiguous areas of memory (possibly consisting of many pages) without having to refer to the page table for every reference. In this manner, the base address and the upper and lower fields are sufficient for a vector memory port to do all the translation and checking for a vector memory instruction that spans many pages. Compilers and the operating system will be responsible for defining and maintaining logical segments containing multiple physically contiguous pages as all vector references have to be entirely contained in such a segment. It is the operating system's responsibility to guarantee that the upper and lower fields always reflect an accurate picture of memory. If a page is removed from memory, all the table entries that include the removed page in their upper/lower ranges must have their upper/lower ranges modified.

In one embodiment of the invention, the logical addresses are 64 bits with byte resolution and physical memory contains up to 128 Gwords (1024 Gbytes.) The physical word address is therefore 37 bits; the byte address is 40 bits. Page sizes vary from 4K words to 128 Mwords in powers of four. Pages are aligned to their natural boundaries such that a 4 Kword pages is on a multiple of 4KWords, a 16 KWord page is on a multiple of 16KWords, etc. The page table is a 4-way set associative TLB. 1024 entries of the largest page size would be sufficient to span all of physical memory, although a small table could be used. Contiguous blocks of software-defined segments of up to 1000 pages are supported. Selector 258 is a 7-to-1 multiplexor, 8 bits wide for the index, 12 bit selective mask for the tag, and 12 bit 2-OR for offset catenation. The page table has 47 bits per entry; 41 bits per tag. Tag compare 288 comprises 4 41 bit equality comparators. Multiplexor 289 comprises a 4-to-1 47 bit wide multiplexor. Permission check block 292 is comprised of small combinational logic, and bounds compare module 281 is comprised of 2 10-bit greater/less than comparators. The page size register 267 is 3 bits, encoded, max register 268 and min register 269 are each 10 bits, or 64 bits if used for other applications as described above. The stride/vector length multiplier 272 is a 64 by 7 multiplier, having a 49 bit product, and the min/max multiplexor 273 is a 10 bit 2-to-1 multiplexor, but may be bigger. The actual values used are not to be taken as limiting the scope of the invention. In the rare event that the addresses referenced in a single vector instruction span a very large range of addresses exceeding the size of physical memory, a scalar loop is used at the programming level to emulate the vector instruction. With the scalar loop, only one data point need be in physical memory for the instruction to execute, whereas without the scalar loop, all the data in a vector needs to be in physical memory for the instruction to execute.

The above embodiment provides full demand-paged functionality. Recoverable traps are always detected immediately after the table look-up. This simplifies the implementation of recoverable addressing traps.

In the second memory architecture, also discussed with reference to FIG. 2, multiple page sizes within a job are provided. By using multiple page sizes within a job, internal page fragmentation is reduced. In one embodiment, separate page tables, TLBs, are used for each job. However, to avoid inefficient use of table entries, a fully associative TLB is shown in FIG. 2. The page descriptor fields include those used for the first architecture and in addition, a four bit page size field is incorporated into the base field 263. The size field is also used for interpreting the upper, lower and base fields, which are expressed in page size units. The state registers to support the multiple page size architecture are the same as for the single size per job architecture except that there is no need for the data page size register since the size is defined in the page table entry for a page. Use of the min and max registers remains the same. The overall flow as described in the previous example is the same except that the page size entry is used to select the proper tag bits from the logical address. The tag bits from every table entry are then compared with the tag bits from the address as selected by the page size. If there is a hit, the other fields of the selected table entry are read out and used to check upper and lower bounds, access privileges, and to form the physical address.

Table 1 summarizes values in bytes for various address and translation table fields, as a function of page size in 8 byte words for the first memory architecture. Note that fewer tag and base bits are required as the page size increases, while the offset requires more bits.

TABLE 1

| Page Size | Tag | Index | Offset | Base | Upper | Lower |
|---|---|---|---|---|---|---|
| 16MW | 29 | 8 | 27 | 10 | 10 | 10 |
| 4MW | 31 | 8 | 25 | 12 | 10 | 10 |
| 1MW | 33 | 8 | 23 | 14 | 10 | 10 |
| 256KW | 35 | 8 | 21 | 16 | 10 | 10 |
| 64KW | 37 | 8 | 19 | 18 | 10 | 10 |
| 16KW | 39 | 8 | 17 | 20 | 10 | 10 |
| 4KW | 41 | 8 | 15 | 22 | 10 | 10 |

In one embodiment of the second memory architecture, the logical addresses are 64 bits with byte resolution and physical memory containing up to 128 Gwords (1024 Gbytes.) The physical word address is therefore 37 bits; the byte address is 40 bits. Page sizes vary from 4 Kwords to 256 Mwords in powers of four. Pages are aligned to their natural boundaries such that a 4 Kword page is on a multiple of 4KWords, a 16 Kword page is on a multiple of 16KWords, etc. The page table is a fully set associative TLB. 64 entries of the largest page size would be sufficient to span all of physical memory, although a small TLB is used in an alternate embodiment. Contiguous blocks of software-defined segments of up to 1000 pages are supported. Select 258 is a 7-to-1 multiplexor, 8 bits wide for the index, a 12 bit selective mask for the tag, and a 12 bit 2-OR for offset catenation. The page table has 51 bits per entry; 49 bits per tag. Tag compare 288 comprises 64 49-bit equality comparators; each with selective mask based on size of the field. Permission check block 292 is comprised of small combinational logic, and bounds compare block 281 is comprised to 2 10-bit greater/less than comparators. The page size register 267 is 3 bits, encoded, max register 268 and min register 269 are each 10 bits, or 64 bits if used for other applications as described above. The stride/vector length multiplier 272 is 64 by 7 multiplier, having a 49 bit product, and the min/max multiplexor 273 is a 10 bit 2-to-1 multiplexor, but may be bigger.

Table 2 shows the widths of the various address translation fields that are required to support each of the page sizes. It is apparent that the field widths of the page table entries are driven by the smallest page size. That is, a tag of 49 bits, a base value of 22 bits, and upper and lower fields of 10 bits each. Larger page sizes would not use all the tag or base bits.

TABLE 2

| Page Size | Tag | Offset | Base | Upper | Lower |
|---|---|---|---|---|---|
| 256MW | 33 | 31 | 6 | 10 | 10 |
| 64MW | 35 | 29 | 8 | 10 | 10 |
| 16MW | 37 | 27 | 10 | 10 | 10 |
| 4MW | 39 | 25 | 12 | 10 | 10 |
| 1MW | 41 | 23 | 14 | 10 | 10 |
| 256KW | 43 | 21 | 16 | 10 | 10 |
| 64KW | 45 | 19 | 18 | 10 | 10 |
| 16KW | 47 | 17 | 20 | 10 | 10 |
| 4KW | 49 | 15 | 22 | 10 | 10 |

The third and fourth architectures are based on segmented virtual memory systems. The addresses contain a 16 bit segment identifier in the upper address bits of the virtual address, and a 48 bit segment offset in the lower address bits. Addresses are to byte resolution. The processor holds a segment table which is directly addressed by the segment identifier. A segment TLB supporting 1K segments is used, and the upper six bits of the address are all zeros in one embodiment. In a further embodiment, the segment table contains up to 64K segments if the upper six bits are used.

A segment is not required to be entirely memory resident. Each segment descriptor holds upper and lower bounds on the extent of the segment that is memory resident. If the reference is to a segment not valid or is out of bounds, there is a recoverable trap. Max and min registers again provide for the detection of recoverable traps at the segment table, just as was done with the paged architectures. The upper and lower bounds allow a section or range of a very large segment to be memory resident, allowing definition of a window in a large memory-mapped file.

Figure 3:
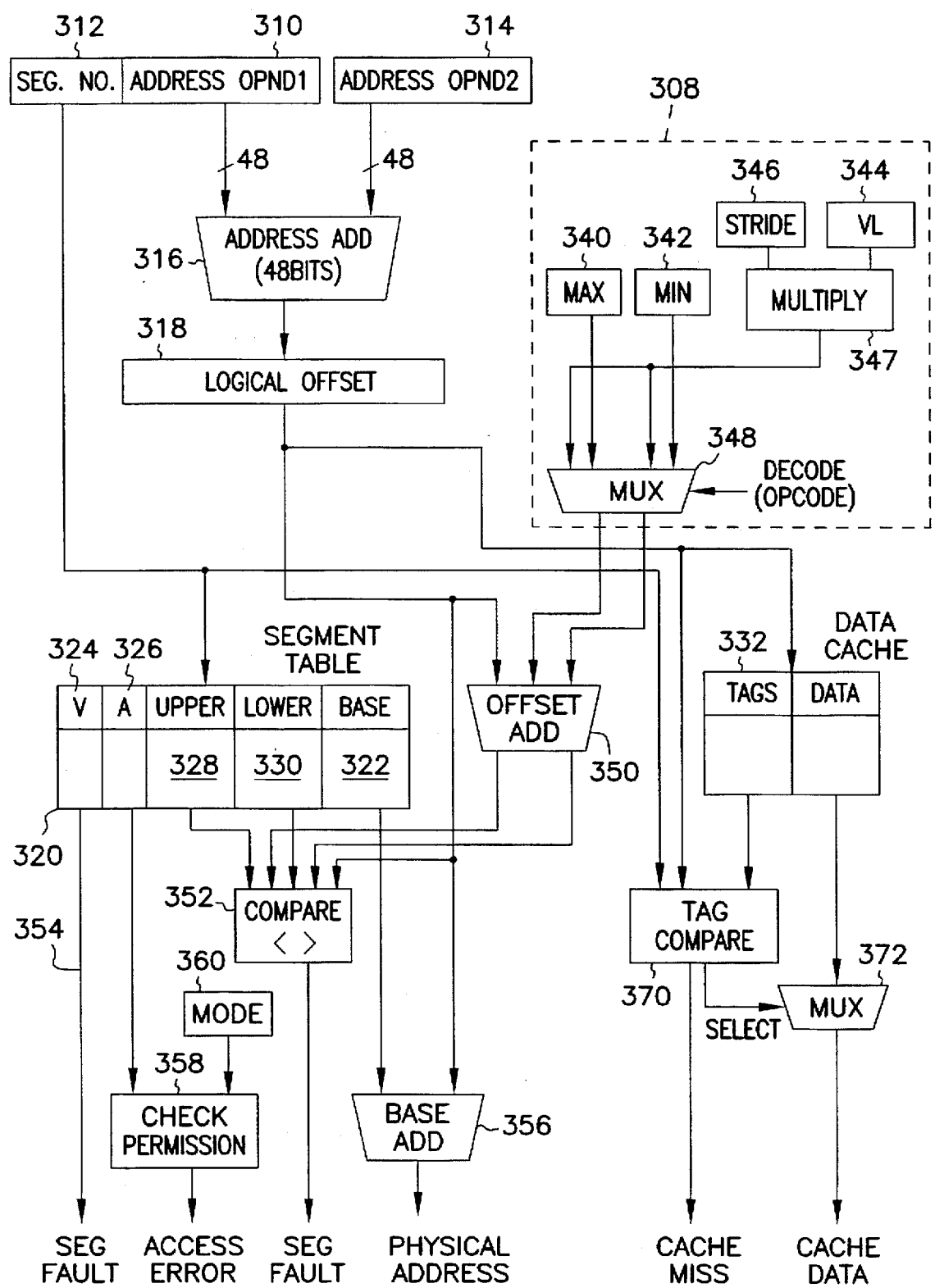
FIG. 3 is a block diagram representation of a segment based address translation and data cache memory access mechanism for a vector based computer system.

FIG. 3 illustrates the address translation mechanism of the third architecture. A first address operand 310 comprises an address operand, and a segment number indicated at 312. A second address operand 314 is added with the first address operand, by adder 316 to form a logical address indicated at 318. The logical address is provided to a segment translation table 320 and a data cache 322 which operates similarly to data cache 466 in FIG. 2. The segment table 320 is directly addressed by the segment identifier 312 and comprises a valid bit field 324 for indicating whether the accessed segment descriptor is for a valid segment. A plurality of access bits at 326 are used to control protection, cacheability and coherence. The segment table 320 also comprises several descriptor fields including an upper field 328, a lower field 330 and a base field 332. The protection bits contain read/write/execute attributes, the cacheability bit indicates whether the segment contains data that may be placed in a data cache 322, and the coherence bit indicates whether the referenced segment contains data upon which coherence must be maintained, either by hardware or software. Base field 332 comprises the address that indicates where in physical memory the segment begins. The base field is expressed in units of some reasonable size, such as 4 Kwords in order to reduce the number of bits needed. Upper field 328 contains a value representing the upper extent of the segment that is memory resident. This value is expressed to the same granularity as the base field. If the entire segment is resident, upper will indicate the size of the segment. The lower field 330 expresses the lower extent of the segment that is memory resident. This value is expressed to the same granularity as the base. If the entire segment is resident, the lower field will be 0.

Several state registers are required to support address translation. A vector address range calculator referred to as a range finder comprising elements enclosed by a broken line 308 provides an indication of the addresses of operands required to be resident in memory for a given vector. A max register 340 contains the maximum offset from the base value that is referenced by a gather or scatter operation. The offset register value is expressed in the segment granularity. A min register 342 contains the minimum offset from the base value that is referenced by a gather or scatter. As with the first and second architectures, a vector min/max instruction scans a vector register and simultaneously determines both the min and max values. The results are placed directly in the min and max registers.

A vector length register 344 and stride register 346 provide their values to a multiplier 347 to provide an upper limit of addresses to a multiplexor 348. If the stride happens to be negative, then a lower bound is provided to multiplexor 348. The values in the min register 342 and max register 340 are also provided to multiplexor 348 which selectively provides output to an offset adder 350 to obtain the physical address limits. A compare module 352 is coupled to the offset adder 350, to the logical offset 318, and to the output of the segment table 320 to ensure that the address ranges are present in the segment table. A segment fault is generated if they are not.

While the segment table 320 is being scanned for the segment, if the data is not found in the table, a segment fault is generated and provided on a line 354. If the data is found in the table, the real address is provided via a base adder 356 which combines the real address with the logical offset 318. Segment table 320 provides the access bits 326 to a permissions module 358 which after receiving a memory access privilege level from a mode module 360 either grants permission to access the referenced portion of the segment, or provides an access error signal.

An example of address translation is now provided. Registers containing address operands are read and the operands are added to form an effective logical (virtual) address. One of the address operands contains a segment number, and the other, if needed, just contains a portion of the overall address. In the case of scalar accesses, the logical addresses are used immediately to access the data cache 322. If there is a cache hit as indicated by a tag compare 370, which is coupled to the data cache 322, the segment identifier 312 and the logical offset 318, the segment translation hardware 320 is not on the critical data path and data is provided via a multiplexor 372 which is coupled to the data cache 322 to receive the data and is gated by tag compare 370. However, segment translation should proceed in case of a cache miss and to check access permissions via permission module 358. The segment portion of the address is used to select and read the proper segment table entry.

The following operations are performed simultaneously:

1) The access permission bits from the descriptor are compared with the type of memory reference being made and the mode. If the type of access being attempted is not allowed, there is a recoverable trap to the operating system.

2) In the event of a vector memory reference, the upper and lower fields are compared with the max and min register values or the vector length times the stride value to determine if all the elements to be referenced are within the region of the segment that is memory resident. If all the referenced elements are not within range, there is a recoverable trap to the operating system.

3) The base field is added to the segment offset bits of the logical address. This is the physical address provided at base adder 356.

In the next step, providing there are no faults, vector operations send the physical (real) address, and the upper and lower values to the address port of the main memory. There, standard gather and scatter instructions check the actual index values against the upper and lower values. If an error is detected at the port, the max/min limits must have been erroneously set, and the job is trapped in an unrecoverable manner. If there is a data cache miss, scalar operations use the physical address to load the cache line. In the event of non-cacheable scalar references, the physical address is used directly to load or store data.

In the event of a fault, the operating system takes over. For segment faults, there are two possibilities. If the requested portion of the segment is in physical memory, but its table entry does not reflect its presence, the table entry is updated and user processing is free to resume. If the requested portion of the segment is not resident in memory, the operating system causes the requested portion to be moved into main memory. Depending on the algorithms used by the operating system, this may involve moving a block of contiguous data comprising a vector so that it is entirely contained in a portion of a segment in main memory.

In one embodiment of the invention, the logical address has 16 segment bits and 48 offset bits with byte resolution. The number of segment bits actually used depends on the size of the segment table. For a first generation system, 64 to 1024 segments might be reasonable. The physical memory contains up to 16 Gwords resulting in a physical word address of 34 bits; the byte address is 37 bits. Segment sizes are expressed in multiples of 4 Kwords, up to a maximum segment size of 16 Gwords aligned at 4 Kword boundaries. Based on the 4 Kword granularity, the elements of FIG. 3 are set forth in further detail in Table 3.

TABLE 3

| Segment table Each entry is 105 bits. | |
|---|---|
| Offset adder | Two 33 bit adders |
| Permission Check | Small combinational logic |
| Bounds Compare | 2 33 bit > comparators |
| Base Add | 33 bit adder |
| Max Register | 64 bits (if used for other functions) otherwise 33 bits |
| Min Register | 64 bits (if used for other functions) otherwise 33 bits |
| Stride/VL multiplier | 64-by-7 multiplier |
| Max/min Mux | 33 bit 2-to-1 multiplexor |

For segment granularities of 4 Kwords, the base, upper and lower fields are 33 bits in length. In further embodiments, such as 16 Kwords, they are 31 bits, and the fields are 29 bits for 64 Kword segments.

In this third memory management architecture, full virtual memory functionality is supported and recoverable traps occur immediately after the segment table look-up. By reducing the number of segment table entries, hardware costs are kept relatively low. As few as 64 table entries are used.

There are several variations on the segmented memory architecture. In a first variation, a granularity field is used in the segment table to reduce the size of the upper and lower table entries. Large segments have large granularity, and small segments have small granularity. Segments are on granularity boundaries. Given eight granularities ranging from 4 Kwords to 64 Mwords in 4x increments, a maximum size segment of 16 Gwords have 256 of the 64 Mword granules. Hence the upper and lower fields are reduced to eight bits each. The total descriptor size is reduced to about 58 bits (V=1, A=5, base=33, granularity=3, upper=8 and lower=8.) Additional logic uses the granularity bits to align the max/min compares.

A second variation provides demand segmentation for partial segments. The lower descriptor field is removed. This reduces the descriptor size, but eliminates the ability to construct a window into very large memory-mapped files. Segments are allowed to grow at runtime on demand.

A third variation provides demand segmentation for entire segments only, removing both the upper and lower fields. Faults result only if the valid bit is false. A fourth variation provides no demand segmentation.

Figure 4:
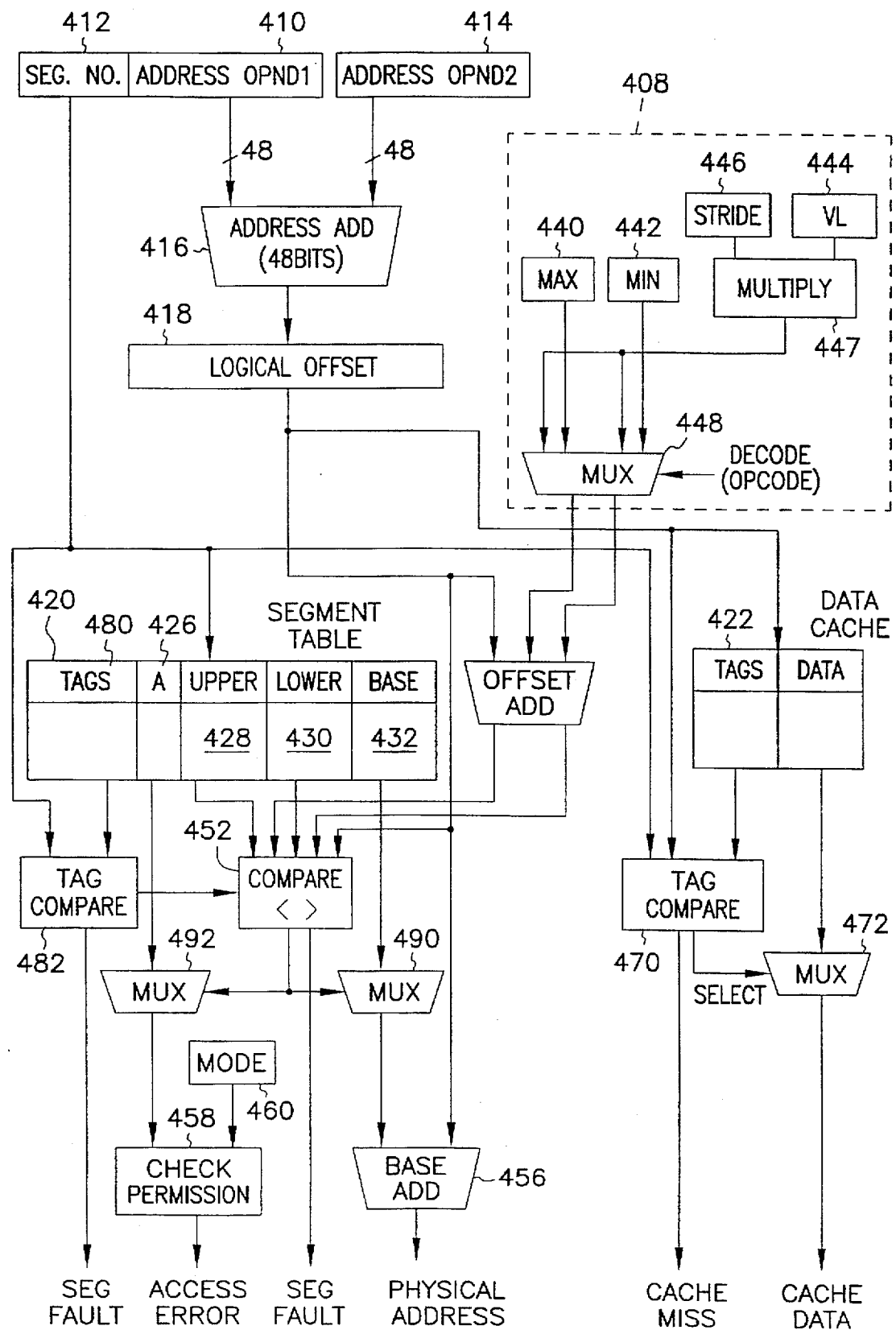
FIG. 4 is a block diagram representation of an alternative segment based address translation and data cache memory access mechanism for a vector based computer system.

The fourth memory management architecture provides segmentation with an associatively addressed table comprising a TLB as seen in FIG. 4. By using an associatively addressed segment table, support for more than one window or range of addresses is provided and some limitations on the number of segments are removed. As with the third architecture, the address consists of a 16 bit segment identifier in the upper address bits and a 48 bit segment offset in the lower address bits. Addresses have byte resolution. All 64K segments are available, regardless of the size of the segment translation table. The processor holds the segment table which is associatively accessed with the segment identifier. A segment does not have to be entirely memory resident. As with the previous architecture, upper and lower bounds in the segment descriptor allow a section of a very large segment to be memory resident. In addition, by using an n-way set associative segment table, up to n windows into the same segment are supported.

A segment table 420 contains the same fields as the previously described segmented system of FIG. 3 with direct look-up. However, there is also a tag field 480 associated with each entry to support the associative look-up. A vector address range calculator referred to as a range finder comprising elements enclosed by a broken line 408 provides an indication of the addresses of operands required to be resident in main memory for a given vector. A plurality of state registers 440, 442, 446, 444, 460 to support address translation are the same as those used by the previously described segmented architecture. Other elements numbered consistently with FIG. 3 except that the hundreds digit is a "4" also have the same function as those in FIG. 3 and are not described further. Instructions to support this variation on the third segmented memory architecture are also the same.

Registers 410 and 414 containing address operands are read and the operands are added to form an effective logical (virtual) address. One of the address operands contains a segment number, and the other, if needed, contains only an offset value. In the case of scalar accesses, the logical addresses are used immediately to access the data cache 422. If there is a cache hit as indicated by a tag compare 470, which is coupled to the data cache 422, the segment identifier 412 and the logical offset 418, the segment translation hardware 420 is not on the critical data path and data is provided via a multiplexor 472 which is coupled to the data cache 422 to receive the data and is gated by tag compare 470. However, segment translation should proceed in case of a cache miss and to check access permissions via permission module 458.

Based on the set associativity of the table, low order segment identifier bits are used to index into the translation table 420. Some hashing of the segment bits is first used in one embodiment to ensure randomization of the table addresses. The index field of the segment identifier is used to select the set of descriptors to be examined. Then, the tag field of the segment identifier is compared with the tag fields in the descriptors of the addressed set at tag compare 482. Simultaneously, the upper and lower fields of the descriptors are compared with the max/min (or VL*stride) values at compare 452 to ensure that all the data required to proceed with an operation on a vector are in main memory. If a tag matches, and the max/min (or VL*stride) values are within the bounds of a descriptor, the set is selected and a pair of multiplexors 490 and 492 are enabled by compare 452. If none of the tags match, or if all matching tags have upper/lower values that do not include the max/min (or VL*stride), there is a segment fault to the operating system.

The following operations are performed simultaneously if enabled by multiplexors 490 and 492. If activated by compare 452, multiplexor 492 gates the access bits to permission check 458 and multiplexor 490 gates the base field value to the base adder 456. The access permission bits from the descriptor are compared with the type of memory reference being made and the mode. If the type of access being attempted is not allowed, there is a recoverable trap to the operating system. The base field is added to the segment offset bits of the logical address. This is the physical address provided at base adder 456.

In the next step, providing there are no faults, vector operations send the physical (real) address, and the upper and lower values to the address port of the main memory. There, standard gather and scatter instructions check the actual index values against the upper and lower values. If an error is detected at the port, the max/min limits must have been erroneously set, and the job is trapped in an unrecoverable manner and the job is terminated. If there is a data cache miss, scalar operations use the physical address to load the cache line. In the event of non-cacheable scalar references, the physical address is used directly to load or store data.

In the event of a fault, the operating system takes over. For segment faults, there are two possibilities. If the requested portion of the segment is in physical memory, but its table entry does not reflect its presence, the table entry is updated and user processing is free to resume. If the requested portion of the segment is not resident in memory, the operating system causes the requested portion to be moved into main memory. Depending on the algorithms used by the operating system, this may involve moving a block of contiguous data comprising a vector so that it is entirely contained in a portion of a segment in main memory. In either event, the state of selected registers for the few instructions executed in a job are saved in a well known manner on detection of the fault, and execution of the job is then allowed to continue when the data is retrieved.

In one embodiment of the invention, the logical address has 16 segment bits and 48 offset bits with byte resolution. The number of segment bits actually used depends on the size of the segment table. For a first generation system, 64 to 1024 segments might be reasonable. The physical memory contains up to 16 Gwords resulting in a physical word address of 34 bits; the byte address is 37 bits. Segment sizes are expressed in multiples of 4 Kwords, up to a maximum segment size of 16 Gwords aligned at 4 Kword boundaries. Based on the 4 Kword granularity, the elements of FIG. 4 are set forth in further detail in Table 4.

TABLE 4

| Segment table Each entry is 105 bits. | |
| --- | --- |
| Offset adder | Two 33 bit adders |
| Tag Compare | 4 14-bit = comparators |
| Permission Check | Small combinational logic |
| Bounds Compare | 8 33 bit > comparators |
| Descriptor Mux | 4-to-1 mux 40 bits wide (approx) |
| Base Add | 33 bit adder |
| Max Register | 64 bits (if used for other functions) otherwise 33 bits |
| Min Register | 64 bits (if used for other functions) otherwise 33 bits |
| Stride/VL multiplier | 64-by-7 multiplier |
| Max/min Mux | 33 bit 2-to-1 multiplexor |

Full virtual memory functionality is supported, and recoverable traps occur immediately after the segment table look-up. 64K logical segments are supported, and by reducing the number of segment table entries, hardware costs are kept relatively low.

Conclusion

All four of the architectures described above use the vector length times the stride or min/max address range as parameters to determine if the information to be used during an operation on a vector are already resident in local storage. This provides for detection of recoverable trap conditions immediately after a TLB look-up. Early detection greatly simplifies recovery from faults when performing operations in a vector based machine having a virtual memory architecture. Rather than detecting faults after many instructions have already been executed, early detection reduces the amount of status information that must be saved to recover from a fault. It provides an efficient way to implement a virtual memory system on a vector based machine. Use of set associative TLBs many ranges of addresses within a segment are supported such that an entire large segment need not be resident in local, fast memory.

It is to be understood that the above description is intended to be illustrative, and not restrictive. Many other embodiments will be apparent to those of skill in the art upon reviewing the above description. Several numbers were proposed for segment and page lengths, as well as register sizes and comparator sizes which can be easily varied by one skilled in the art without departing from the spirit and scope of the present invention. Also, many of the functions were described as being implemented in hardware. One skilled in the art can easily migrate such functions into software, especially in machines where clock periods are very fast. The scope of the invention should, therefore, be determined with reference to the appended claims, along with the full scope of equivalents to which such claims are entitled.

What is claimed is:

1. A virtual memory system for a vector based computer system performing operations on vectors of operands, the memory system comprising:
    a main memory addressed by real addresses;
    a vector register for storing multiple virtual addresses of operands;
    a data block lookup table coupled to the vector register for receiving at least a portion of each operand address, said table comprising information identifying operands present in main memory;
    a range finder containing information related to a range of addresses in the vector register; and
    a comparator coupled to the data block lookup table and to the range finder for determining if the operands in the vector register are present in the main memory.

2. The virtual memory system of claim 1 wherein the computer system performs an operation on an operand during a clock cycle, and the comparator makes its determination within a few clock cycles of the start of an operation on a first operand in a vector.

3. The virtual memory system of claim 1 wherein the data block lookup table comprises a page Translation lookaside buffer, and wherein data is stored in the main memory in a page format.

4. The virtual memory system of claim 3 wherein the page size is variable between jobs and is fixed for data used within a job.

5. The virtual memory system of claim 4 wherein the page size for instructions is different than the page size for data.

6. The virtual memory system of claim 3 wherein the range finder comprises:
    a max register for identifying the maximum address of pages required to perform operations on all operands in the vector register; and
    a min register for identifying the minimum address of pages required to perform operations on all operands in the vector register.

7. The virtual memory system of claim 6 wherein the range finder further comprises:
    a vector length register for identifying the number of operands in the vector register;
    a stride register for indicating the number of operands in the vector register to skip while performing operations; and
    a multiplier for multiplying the values in the vector length register times the stride register to identify a maximum address range of operands in the vector register.

8. The virtual memory system of claim 7 wherein the range finder further comprises a multiplexor coupled to the multiplier and to the min and max registers for multiplexing the values provided by the multiplier and registers to the comparator based on the type of operation to be performed.

9. The virtual memory system of claim 3 wherein the page Translation lookaside buffer comprises multiple fields comprising:
    a base address identifying the beginning of a referenced page in main memory;
    an upper range identifying the number of pages at higher addresses that are physically contiguous with the referenced page;
    a lower range identifying the number of pages at lower addresses that are physically contiguous with the referenced page; and
    a tag for associative lookup of the referenced page.

10. The virtual memory system of claim 9 wherein the page Translation lookaside buffer fields further comprise a plurality of access bits to control access to the page.

11. The virtual memory system of claim 10 wherein the page Translation lookaside buffer is set associative.

12. The virtual memory system of claim 10 wherein the page Translation lookaside buffer fields further comprise a page size field for identifying the size of a referenced page such that multiple page sizes are usable within a job.

13. The virtual memory system of claim 12 wherein the page Translation lookaside buffer is fully associative.

14. The virtual memory system of claim 1 wherein the data block lookup table comprises a segment Translation lookaside buffer, and wherein data is stored in the main memory in a segment format.

15. The virtual memory system of claim 14 wherein each logical address comprises a segment identifier and the segment Translation lookaside buffer is addressed based on the segment identifier.

16. The virtual memory system of claim 15 wherein the segment size is variable within each job.

17. The virtual memory system of claim 14 wherein each logical address comprises a segment identifier and the segment Translation lookaside buffer is n-way associatively addressed based on the segment identifier where n is an integer greater than 1.

18. The virtual memory system of claim 17 wherein the segment Translation lookaside buffer provides for up to n ranges for each segment.

19. The virtual memory system of claim 18 wherein n=4.

20. The virtual memory system of claim 14 wherein the segment Translation lookaside buffer comprises multiple fields comprising:
  a base address identifying the beginning of a referenced segment resident in main memory;
  an upper range identifying the upper extent of the segment that is resident in main memory; and
  a lower range identifying the lower extent of the segment that is resident in main memory.

21. The virtual memory system of claim 20 wherein the segment Translation lookaside buffer fields further comprise a plurality of access bits to control access to the referenced segment.

22. The virtual memory system of claim 14 wherein the range finder comprises:
  a max register for identifying the maximum offset from a base address to be referenced by a gather/scatter operation on the vector; and
  a min register for identifying the minimum offset from the base address to be referenced by a gather/scatter operation on the vector.

23. The virtual memory system of claim 22 wherein the range finder further comprises:
  a vector length register for identifying the number of operands in the vector register;
  a stride register for indicating the number of operands in the vector register to skip while performing operations; and
  a multiplier for multiplying the values in the vector length register times the stride register to identify a maximum address range of operands in the vector register.

24. The virtual memory system of claim 23 wherein the range finder further comprises a multiplexor coupled to the multiplier and to the min and max registers for multiplexing the values provided by the multiplier and registers to the comparator based on the type of operation to be performed.

25. A method of detecting faults for a virtual memory system for a vector based computer system comprising a main memory, a vector register containing multiple virtual addresses referencing operands, and a real address lookup table, comprising the steps of:
  receiving a virtual address;
  determining via the lookup table the real address based on a portion of the virtual address and a range of addresses of operands resident in main memory;
  identifying a range of addresses required to perform operations on the operands referenced in the vector register;
  comparing the addresses required to perform operations on the operands referenced in the vector register with the range of addresses of operands residing in main memory; and
  generating a recoverable trap if all such operands required are not resident in main memory within a few clock cycles following the beginning of the operation.

26. The method of claim 25 wherein the data lookup table comprises a page Translation lookaside buffer, and wherein data is stored in the main memory in a page format.

27. The method of claim 26 wherein the page size is variable between jobs and is fixed for data used within a job.

28. The method of claim 27 wherein the page size for instructions is different than the page size for operands.

29. The method of claim 26 wherein the step of identifying a range of addresses required to perform operations on the operands referenced in the vector register further comprises:
  identifying the number of operands in the vector register;
  identifying a stride value; and
  multiplying the number of operands in the vector register times the stride value to identify the maximum address range of operands to be used in an operation.

30. The method of claim 26 wherein the step of identifying a range of addresses required to perform operations on the operands referenced in the vector register further comprises:
  scanning the vector register for the maximum address of pages required to perform operations on all operands in the vector register; and
  scanning the vector register for the minimum address of pages required to perform operations on all operands in the vector register.

31. The method of claim 25 wherein the lookup table comprises a segment Translation lookaside buffer, and wherein data is stored in the main memory in a segment format.

32. The method of claim 31 wherein the length of the segments is variable.

33. The method of claim 32 wherein the segment table identifies at least one window of contiguous data within a segment that is resident in main memory.

34. The method of claim 33 wherein each logical address comprises a segment identifier and the segment Translation lookaside buffer is n-way associatively addressed based on the segment identifier where n is an integer greater than 1.

35. The method of claim 34 wherein the segment table provides for up to n windows for each segment.

36. The method of claim 35 wherein n=4.

37. The virtual memory system of claim 31 wherein the step of identifying a range of addresses required to perform operations on the operands referenced in the vector register further comprises:
  identifying the number of operands in the vector register;
  identifying a stride value; and
  multiplying the number of operands in the vector register times the stride value to identify the maximum address range of operands to be used in an operation.

38. The virtual memory system of claim 31 wherein the step of identifying a range of addresses required to perform operations on the operands referenced in the vector register further comprises:
  scanning the vector register for the maximum real address range required to perform operations on all operands in the vector register; and
  scanning the vector register for the minimum real address range required to perform operations on all operands in the vector register.

* * * * *